2,775,599

PROCESS FOR THE PRODUCTION OF
N-VINYLPYRROLIDONE-2

Bruno Puetzer and Leon Katz, Cincinnati, Ohio, and Lester Horwitz, Binghamton, N. Y., assignors to Schenley Industries, Inc., New York, N. Y., a corporation of Delaware No Drawing. Application April 10, 1952,
Serial No. 281,658

4 Claims. (Cl. 260—326.5)

This invention relates generally to processes for the synthesis of organic chemical compounds, particularly the substance N-vinylpyrrolidone-2, which is an intermediate used in the manufacture of polyvinylpyrrolidone, the high polymer component of blood plasma extenders, and which otherwise is useful in organic synthesis.

Heretofore, N-vinylpyrrolidone-2 has been synthesized by reactions that may be indicated in general terms as follows:

$$HC \equiv CH + 2HCHO \longrightarrow HO.CH_2.C \equiv C.CH_2.OH$$
(acetylene)  (formaldehyde)                (2-butyne-1:4-diol)

$$\Big| + 2H_2$$

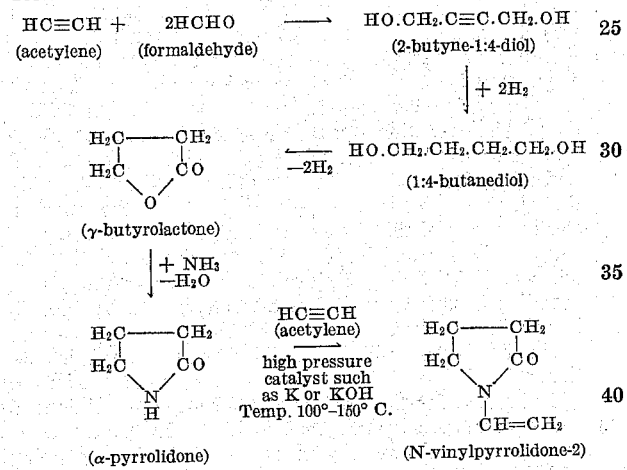

(γ-butyrolactone)

$$\Big| \begin{array}{l} + NH_3 \\ -H_2O \end{array}$$

(α-pyrrolidone) → high pressure catalyst such as K or KOH Temp. 100°–150° C. → (N-vinylpyrrolidone-2)

The above-indicated reaction between α-pyrrolidone and acetylene under high pressure in the presence of a basic catalyst is a typical vinylation reaction which involves replacement of the hydrogen atom of the imino nitrogen atom of the pyrrolidone by the vinyl group, —CH=CH₂, derived from acetylene. This step in the synthesis, particularly in operations of the magnitude necessary for commercial production of N-vinylpyrrolidone-2, has the disadvantage of presenting operational hazards that can be met only by employing costly and elaborate precautions and maintenance of rigid control of all operating conditions. Acetylene is an extremely reactive substance, having a latent energy of about 54,900 calories per gram molecule; it is very dangerous to handle even at atmospheric pressure because it forms explosive mixtures with air, but at higher pressures it explodes upon ignition with such terrific violence that extreme care must be observed constantly when using it if disastrous explosions are to be avoided. Furthermore this step in the synthesis of N-vinylpyrrolidone-2 has the further disadvantage of requiring the use of bulky and very expensive high pressure reaction vessels and other equipment which it obviously would be desirable to avoid using.

An object of this invention is to provide a process for the synthesis of N-vinylpyrrolidone-2 that avoids the use of acetylene, with its incident hazards, and wherein the reactions are conducted at moderate temperatures and ordinary atmospheric pressure, thus eliminating need for the use of high pressure equipment.

In accordance with this invention, N-vinylpyrrolidone-2 is obtained, in monomeric state and in a satisfactory yield, by reactions that may be indicated in general terms as follows:

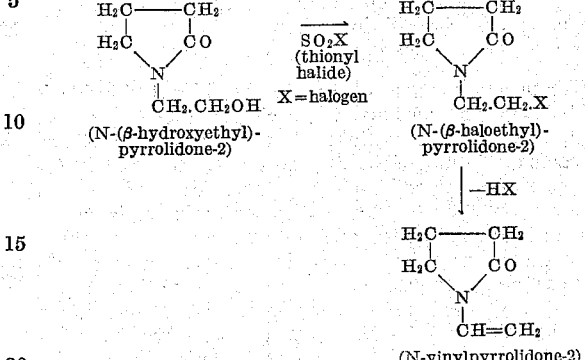

The starting material utilized in the process of this invention, N-(β-hydroxyethyl)-pyrrolidone-2, may be prepared, if desired, in accordance with known methods, for example by passing γ-butyrolactone and ethanolamine, in vaper phase at a temperature in the range of 200° C. to 400° C. and at atmospheric pressure, over a catalyst containing as an essential constituent a substance capable of splitting off water, comprising silicic acid or an oxide, phosphate or borate of aluminum, thorium, titanium or zirconium. The reactants are mixed in such proportions that the ethanolamine exceeds the stoichiometric quantity and the mixture is passed over the catalyst at a rate equivalent to one mol of the lactone per liter of catalyst per hour. Alternatively this starting material may be obtained by liquid phase operations at a slower rate and without need for use of a catalyst, as follows: γ-butyrolactone and ethanolamine may be mixed and heated under reflux at a temperature of 150° C. to 220° C. for a period of about 20 hours or less depending upon the temperature used, then working up the reaction mixture to remove water and obtain the desired product. For instance, by refluxing, for about 20 hours at a temperature between about 180° C. and 190° C., a mixture of about 860.0 grams of γ-butyrolactone (10.0 mols) and 750.0 grams of ethanolamine (12.3 mols) and gradually distilling off the liberated water formed and excess ethanolamine, upon distillation under subatmospheric pressure, about 1132.5 grams of N-(β-hydroxyethyl)-pyrrolidone-2 (ca. 88% of theory) is obtained.

The treatment of N-(β-hydroxyethyl)-pyrrolidone-2 with a thionyl halide to convert the β-hydroxyethyl group to a β-haloethyl group may be performed in a suitable substantially inert organic solvent medium, for example a liquid aromatic hydrocarbon such as benzene. The reaction proceeds smoothly at ordinary room temperatures upon mixing the reactants but, as it is an exothermic reaction, the rate at which the reactants are brought into reaction should be so controlled that the temperature of the reaction mixture does not rise materially above about 35° C. Among the thionyl halides that may be utilized in this reaction are thionyl chloride, which is the preferred reagent, and thionyl bromide or thionyl bromochloride, which also may be used, if desired. After the reaction mixture has reached a substantially stable equilibrium state, the solvent component may be removed, for example by distillation, to isolate the intermediate, N-(β-chloroethyl)pyrrolidone-2.

This intermediate product, in solution in a suitable substantially inert organic solvent medium, is then treated with a basic reagent capable of abstracting hydrogen halide from the intermediate product, whereby the β- haloethyl group is converted to a vinyl group. Among the basic reagents that may be employed for this purpose are the alkali-metal hydroxides other than sodium hydroxide, the alkali-metal amides and the alkali-metal lower alkoxides, the sodium and potassium compounds being especially preferred, generally, and, of these, potassium hydroxide or methoxide being the particularly preferred reagents.

The following examples illustrate specific applications of the principles of this invention.

Example 1

About 119.0 grams (1.0 mole) of thionyl chloride is added with stirring at a rate such that the temperature of the mixture does not exceed approximately 35° C., to a cooled solution of 129.0 grams (1.0 mole) of N-(β-hydroxyethyl)-pyrrolidone-2 in 100 milliliters of benzene. After completion of the addition, the mixture is stirred for an additional period of 3 hours at room temperature, then the benzene is removed by evaporation at a sub-atmospheric pressure and the residue is distilled under vacuum, yielding a colorless liquid distillate having a boiling point of 118–119.5° C. at a pressure of 7 millimeters of mercury. This product, weighing about 112.4 grams, equivalent to 75.9% of the stoichiometric yield, is N-(β-chloroethyl)-pyrrolidone-2. Upon standing, the product darkens in color.

Approximately nine grams (0.17 mole) of sodium methoxide is added to a solution of 22.2 grams (0.15 mole) of N-(β-chloroethyl)-pyrrolidone-2, which may be prepared as above described, in 100 milliliters of benzene, and the mixture is stirred at room temperature for 4 hours. The mixture spontaneously warms sufficiently during addition of the sodium methoxide that extraneous heating is unnecessary. Thereafter the mixture is filtered, the benzene is evaporated from the filtrate under vacuum and the residue is distilled under vacuum, yielding a distillate weighing about 8.1 grams (48.5% of the theoretical) of N-vinylpyrrolidone-2, having a boiling point of 70–71° C. at a pressure of 2.0 mm., a freezing point of 15.2° C. (uncorrected) and a refractive index of 1.5019 at 28.5° C. (sodium D line).

Example 2

A mixture of 14.8 grams (0.1 mole) of N-(β-chloroethyl)-pyrrolidone-2 in 100 milliliters of benzene and about 3.9 grams (0.1 mole) of sodium amide is heated under gentle reflux for a period of approximately 5 hours, then filtered, the benzene is evaporated from the filtrate as in Example 1, and the product is recovered by vacuum distillation. The product, N-vinylpyrrolidone-2, is obtained in a yield of 6.1 grams (55.0% of theoretical).

Example 3

A mixture of about 14.8 grams (0.1 mole) of N-(β-chloroethyl)-pyrrolidone-2 in 125 milliliters of benzene and 6.7 grams of potassium hydroxide (assaying 85% KOH and corresponding to 0.1 mole) is heated under gentle reflux for 22 hours in a flask provided with a condenser and a Dean and Stark water separator in which liberated water is condensed, separated, and the benzene periodically returned to the flask. The reaction mixture is then filtered, the benzene is evaporated under reduced pressure and the residue is distilled under vacuum. The product, N-vinylpyrrolidone-2, thus obtained weighs about 6.2 grams, which is equivalent to 55.9% of the stoichometric yield.

Example 4

A mixture of about 860.0 grams (10.0 moles) of γ-butyrolactone nad 750.0 grams (12.3 moles) of ethanolamine is heated under reflux to a temperature between 180 and 190° C. and maintained within this temperature range for a period of approximately 20 hours. During this heating, the liberated water, together with excess ethanolamine, gradually distills over. The residue is then subjected to distillation at sub-atmospheric pressure, to recover a fraction containing, chiefly, N-(β-hydroxyethyl)-pyrrolidone-2, having a boiling range of 133° to 152° C. at a pressure of 2.3 millimeters of mercury. This distillate fraction is treated with thionyl chloride as described in Example 1, but the resultant reaction mixture is not distilled; instead, the solvent benzene is separated by evaporation and any remaining thionyl chloride, sulfur dioxide or hydrogen chloride is neutralized by the addition of solid sodium bicarbonate to the mixture. The crude neutralized product, containing N-(β-chloroethyl),pyrrolidone-2 is then reacted with potassium hydroxide and recovered as described in Example 3 to obtain a satisfactory yield of N-vinyl-pyrrolidone-2. Instead of neutralizing the crude reaction mixture with sodium bicarbonate, it can be blown with air to drive out the remaining thionyl chloride, sulfur dioxide and hydrogen chloride. The neutralization can also be effected before evaporation of the benzene, if desired, and the precipitated salts can be removed by filtration or other conventional methods.

Although the foregoing examples describe certain preferred specific embodiments of the process of this invention, it is to be understood that they are merely provided by way of example and that obvious variations and modifications may be made therein without departing from the general principles of the invention. For example, the temperatures at which the reactions are performed may be varied somewhat and the reactions may be conducted in the absence of solvents or in the presence of inert solvents, or other solvents than benzene, may be used. The proportions of reactants may also be varied over a wide range. In addition to the dehydrohalogenating agents disclosed in the examples, other strong alkalies may be used, including the amides and alkoxides or alcoholates of other alkali metals. Although N-(β-chloroethyl)-pyrrolidone-2 is the specific starting material that is dehydrohalogenated according to certain of the examples to produce N-vinylpyrrolidone-2, other N-(β-haloethyl)-2-pyrrolidones, such as the corresponding bromine and iodine derivatives, can be utilized in a similar manner.

Having thus described the subject matter of this invention, what it is desired to secure by Letters Patent is:

1. Process for the production of N-vinylpyrrolidone-2 which comprises heating in the liquid phase, at a temperature not substantially in excess of the boiling point of benzene and at ordinary atmospheric pressure, a solution in a substantially inert organic solvent of an N-(β-haloethyl)-pyrrolidone-2 and a basic reagent selected from the group consisting of alkali-metal amides, potassium hydroxide and lower alkoxides of the alkali-metals, separating the solvent from the reaction mixture, and recovering N-vinylpyrrolidone-2 by distillation at a sub-atmospheric pressure.

2. The process defined in claim 1 wherein the basic reagent is sodium amide.

3. The process defined in claim 1 wherein the basic reagent is sodium methoxide.

4. The process defined in claim 1 wherein the basic reagent is potassium hydroxide.

References Cited in the file of this patent

UNITED STATES PATENTS

| | | |
|---|---|---|
| 2,153,993 | Reppe | Apr. 11, 1939 |
| 2,393,132 | Wagner | Jan. 15, 1946 |
| 2,532,573 | Salisbury | Dec. 5, 1950 |
| 2,591,506 | Brooks | Apr. 1, 1952 |
| 2,669,570 | Schnizer | Feb. 16, 1954 |

FOREIGN PATENTS

| | | |
|---|---|---|
| 472,296 | Canada | Mar. 20, 1951 |

OTHER REFERENCES

Bachman: J. Org. Chem., vol. 10 (1945), pp. 244 and 249.